(12) United States Patent
Banerjee et al.

(10) Patent No.: US 8,316,080 B2
(45) Date of Patent: *Nov. 20, 2012

(54) INTERNATIONALIZATION OF A MESSAGE SERVICE INFRASTRUCTURE

(75) Inventors: Debasish Banerjee, Rochester, MN (US); David Alan Zavala, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1895 days.

This patent is subject to a terminal disclaimer.

(21) Appl. No.: 10/347,073

(22) Filed: Jan. 17, 2003

(65) Prior Publication Data

US 2004/0143631 A1 Jul. 22, 2004

(51) Int. Cl.
*G06F 15/16* (2006.01)
(52) U.S. Cl. .................... 709/203; 709/204
(58) Field of Classification Search ............ 709/206
See application file for complete search history.

(56) References Cited

U.S. PATENT DOCUMENTS

| | | | |
|---|---|---|---|
| 6,233,317 B1 * | 5/2001 | Homan et al. | 379/88.05 |
| 6,745,197 B2 * | 6/2004 | McDonald | 1/1 |
| 6,850,941 B1 * | 2/2005 | White et al. | 1/1 |
| 7,072,934 B2 * | 7/2006 | Helgeson et al. | 709/203 |
| 2002/0123878 A1 | 9/2002 | Menke | |
| 2002/0162093 A1 * | 10/2002 | Zhou et al. | 717/130 |
| 2002/0188722 A1 * | 12/2002 | Banerjee et al. | 709/225 |

OTHER PUBLICATIONS

TCP/IP Illustrated vol. 1, W. Richard Stevens. Page—Inside Front Page.*
Microsoft Computer Dictionary 5th edition, pp. 287, 518.*
"XML (Extensible Markup Language)" downloaded from <http://searchsoa.techtarget.com/definition/XML?vgnextfmt=print>. Posted on Oct. 3, 2000.*
Kumhyr, et al., U.S. Appl. No. 10/042,108 "Method and System for Localizing Java Jar Files", filed Jan. 8, 2002.
Brooks, et al., U.S. Appl. No. 10/142,629 "Message Compiler for Internationalization of Application Programs", filed May 9, 2002.
Banerjee, et al., U.S. Appl. No. 10/000,686 "Management Strategies for Internationalization in a Distributed Computer Environment", filed Oct. 31, 2001.
Banerjee, et al., U.S. Appl. No. 10/041,219 "Internationalization of the Web Services Infrastructure", filed Jan. 8, 2002.
Banerjee, et al., "The Internationalization Service in IBM Websphere", 20th International Unicode Conference, Washington, DC, Jan./Feb. 2002.

(Continued)

*Primary Examiner* — Scott Christensen
(74) *Attorney, Agent, or Firm* — Matthew J. Bussan (57) ABSTRACT

The present invention is generally directed to a method, system, and article of manufacture that provides an internationalization service in a generalized message-oriented middleware system. In one embodiment, the internationalization handler for the MOM messages exists on both the message-producing and the message-consuming sides. The front-end server and back-send server application containers pass control to the internationalization handlers at predefined points during message production and consumption. On the message production side, the message producer passes control to the internationalization handler after the creation of the MOM message is complete but before the message is dispatched by the MOM for routing and delivery. On the message consumption side, the back end application passes control to the consumer side JMS internationalization handler just before invoking an "onMessage" method or similar message listener method. Some embodiments may also include a reply indicator to indicate whether or not the message is a reply to a service request.

20 Claims, 7 Drawing Sheets

OTHER PUBLICATIONS

Banerjee, et al., "Towards the Internationalization of Web Service in IBM Websphere", 22nd International Unicode Conference, San Jose, California, Sep. 2002.

Banerjee, et al., "Managing Internationalization Contexts in IBM Websphere", 22nd International Unicode Conference, San Jose, California, Sep. 2002.

DeMichiel, et al., "Sun Microsystems Enterprise JavaBeans Specification, Version 2.0", Aug. 14, 2001, pp. 1-572.

Ram Jeyaraman, "Java 2 Enterprise Edition J2EE Connector Architecture Specification", Oct. 21, 2002, Version 1.5, pp. 1-299.

\* cited by examiner

INTERNATIONALIZATION OF A MESSAGE SERVICE INFRASTRUCTURE

FIELD OF THE INVENTION

The present invention generally relates to a system and method of providing internationalization information in a loosely coupled, heterogeneous enterprise computing environment. More particularly, the present invention relates to a method of providing an internationalization service in message-oriented middleware.

BACKGROUND

The development of the EDVAC computer system of 1948 is often cited as the beginning of the computer era. Since that time, computer systems have evolved into extremely complicated devices. To be sure, today's computers are more sophisticated than early systems such as the EDVAC. Fundamentally speaking, though, the most basic requirements levied upon computer systems have not changed. Now, as in the past, a computer system's job is to access, manipulate, and store information. This fact is true regardless of the type or vintage of computer system.

One of the techniques computer designers use to improve the way in which a computer system deals with information is to interconnect a variety of individual computers ("nodes") into a distributed computer environment ("network"). In this way, each individual node can benefit from the resources available to all of the other nodes. Some well-known examples of a network are the Internet and intranets. In many networks, some of the nodes act as providers of services or functionality, and other nodes act as consumers of services or functionality. The providers of information or functionality are commonly known as "servers." The consumers of the information or functionality are commonly called "clients."

Conventional networks assumed that the server and its clients operated in the same locale and time zone. With the rise of global networks, however, this assumption no longer holds true. Managed nodes in a system are often located across national boundaries. Unfortunately, this assumption creates a number of difficulties because users in different locales and time zones generally use different languages, currencies, and information formatting conventions. Consequently, a remote user will frequently make a request whose results must be computed in accordance to cultural expectations that differ from those of the server's locale or time zone. Thus, for example, when a conventional server processes a request from a remote user, the server will execute the request under the locale or time zone of the server and, as a result, will impose its own local formatting conventions. This causes the remote user to receive the results of the request in a format that is undesired by that user.

One area posing special problems with regard to handling locale- and time zone-relevant conventions within remote requests is message-oriented middleware ("MOM".) MOM systems play important roles in the design and integration of enterprise systems because they allow for communications between applications on dissimilar systems without time-consuming custom programming. This "loose coupling" feature, in turn, allows organizations to connect different computer systems in diverse geographical locations using dissimilar information technology infrastructures into a seamless operation.

Conventional MOM systems generally provide facilities to create, populate, send, and receive messages. MOM systems may further provide facilities for asynchronous as well as synchronous message delivery; support broadcasting messages to one or several destinations; and provide qualities of service on a per-message basis, such as guaranteed delivery. Java language programs can utilize MOM systems through the Java Message Service ("JMS"). JMS defines a set of standard communication rules (frequently called an "application program interface" or "API") that specify how a JMS client will access the facilities of any supporting MOM system. That is, JMS standardizes the usage of MOM facilities, the implementations of which support JMS and may be provided by any entity (called the "JMS provider"), within Java language programs; and like Java, JMS can be used across different types of computer systems.

In a typical scenario, a JMS message sending client ("JMS producer") transmits computation requests in the form of a JMS message to a consuming client ("JMS consumer") using a JMS destination, typically referred to as a "queue" in point-to-point messaging (or "topic" in publish/subscribe messaging.) The JMS consumer would synchronously receive the incoming message from the queue. In a managed application server environment, such as the Java 2 Platform Enterprise Edition ("J2EE"), an Enterprise JavaBean ("EJB") container would commonly receive the incoming message and asynchronously dispatch it, via a JMS queue, to a well-defined method of the appropriate server application component, commonly, a Message-driven Enterprise Java Bean ("MDB"). JMS consumers perform their business computation utilizing the message's content and return any results to the original message producer client via a new JMS message. Additional details about JMS APIs and messages can be found in the JMS 1.1 specification, which is herein incorporated by reference. Additional details about J2EE and MDBs can be found in the J2EE 1.3 and EJB 2.0 specifications, which are also herein incorporated by reference.

Unfortunately, many of the business computations requested by JMS messages are locale and time zone-sensitive in nature. Existing MOM architectures and implementations, including those supporting JMS, follow the conventional client-server assumption that the message producer and consumer are located in the same locale and time zone. As a result, the message consumer process freely imposes its locale and time zone in the locale- and time zone-sensitive operations requested by the message producer process. The locale and time zone mismatch between the JMS client and the corresponding message-consuming MDB can lead to a variety of problems, such as unexpected and potentially incorrect computations.

Figure 1:
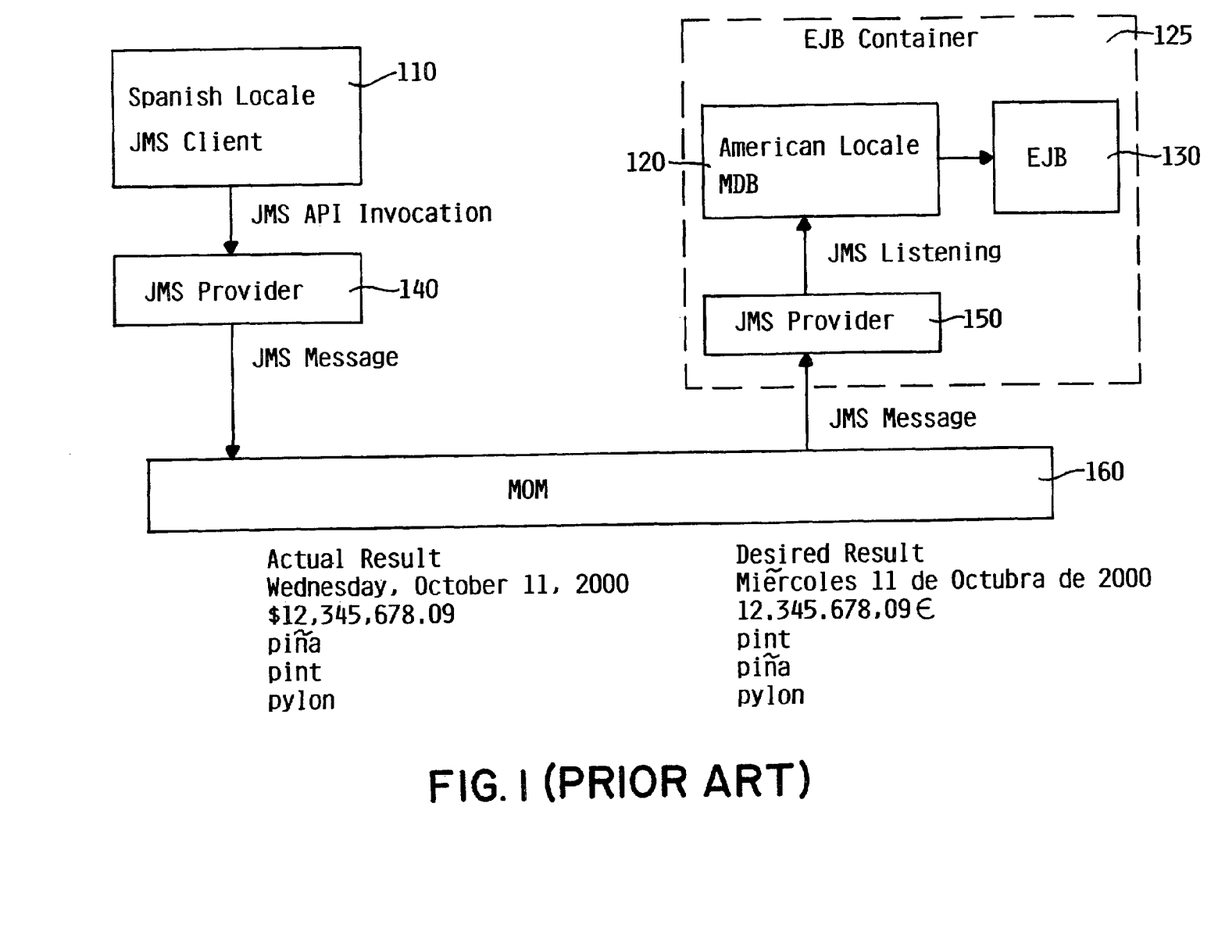
FIG. 1 (Prior Art) is an example of the results from a MOM service request made by a conventional JMS client and a conventional MDB.

FIG. 1 illustrates one such mismatch scenario between a Spanish-locale JMS client 110 and an MDB 120 hosted in an American-locale EJB container 125. The JMS client 110 and the MDB 120 communicate via JMS providers 140, 150 and a MOM application 160. The MDB 120 (probably in conjunction with other EJBs 130) computes a formatted date, a formatted currency and a collated list in response to a message from the JMS client 110. The conventional J2EE implementations will typically compute all the results in the American locale. The JMS client 110, however, expects the results of locale-sensitive computations in its Spanish locale, and not in the MDB's 120 American locale. Although those skilled in the art will appreciate that the MDB 120 in this example could have computed the locale-sensitive results in the JMS client's 110 Spanish locale if the MDB could have accessed the JMS client's 110 locale information, the present JMS infrastructure does not contain a mechanism to propagate the message producer's internationalization information in JMS messages. Another drawback with the present JMS and J2EE architectures is that it is silent about the distribution and utilization of internationalization information in JMS messages.

U.S. patent application Ser. No. 09/870,319, filed May 20, 2001; U.S. patent application Ser. No. 10/000,686, filed Oct. 31, 2001; and U.S. patent application Ser. No. 10/041,219, filed Jan. 8, 2002, which are herein incorporated by reference in their entirety, introduced two new service programming interfaces ("SPI"). The first SPI ("SPI1") extracts an invocation internationalization context associated with the current thread of execution from a thread context manager component. The second SPI ("SPI2") associates a caller internationalization context with the current thread of execution again in the same thread context manager component. These two SPIs are part of an infrastructure for internationalization in distributed, heterogeneous managed environments. The present application extends this internationalization service infrastructure to the domain of MOMs.

Accordingly, a need exists for a method and system for processing MOM messages that addresses the problem of locale and time zone mismatches between the message producer and the message consumer.

SUMMARY

The present invention is generally directed to a method, system, and article of manufacture that extends the applicability of internationalization service to a generalized message-oriented middleware system. One embodiment of the present invention provides three services: (i) propagating internationalization information in JMS messages; (ii) using the existing internationalization service programming applications for attaching internationalization contexts to and retrieving the same from the internal 'thread context manager' component of internationalization service; and (iii) defining and implementing internationalization context handlers for both the JMS message producers and consumers. In this embodiment, the internationalization handler for the MOM messages exists on both the message-producing and the message consumption sides. The front-end server and back-send server application containers pass control to the internationalization handlers at predefined points during message production and consumption. On the message production side, the message producer passes control to the handler internationalization after the creation of the JMS message is complete but before the message gets delivered (sent or published) to the JMS provider for routing and delivery. On the message consumption side, the back end application passes control to the consumer side JMS internationalization handler just before invoking the "onMessage" method or a similar message listening method.

Accordingly, one aspect of the present invention is a method for providing internationalization context in a messaging middleware environment. One embodiment of this method comprises generating a message, attaching an internationalization context to the message, and sending the message with the internationalization context to a messaging facility. Some embodiment may further comprise receiving a request to generate a message and determining the internationalization context associated with the thread on which the request is executing, wherein the internationalization context is determined using a table that associates the internationalization context with the thread. The header in these embodiments may contain a country identifier, a language identifier, a time zone identifier, and a variant identifier.

Another aspect of the present invention is a method for providing internationalization context in a messaging middleware environment, comprising receiving the message having a service request and an internationalization context, extracting an internationalization context from the message, storing the internationalization context to a table that associates the internationalization context with the thread upon which service request is dispatched, and processing the service request according to the internationalization context. In some embodiments, the service request is processed according to the status of a reply indicator.

Still another aspect of the present invention is a computer program product comprising a program which, when executed by a processor, performs a method of sending a message from a message-producing client to a message consumption client, and a signal bearing media bearing the program. The method in these embodiments comprises generating a header having an internationalization context of the message-producing client; attaching the header to a message; and sending the message with the internationalization header to the message-consuming client.

Still another aspect of the present invention is a method for managing message context in a messaging middleware environment. One embodiment of this method comprises generating a message having a message context, attaching a reply indicator to the message; and sending the message with the reply indicator to a messaging facility. In some embodiments, the message context is an internationalization context. In other embodiments, the message context is a security context, debugging context, or some other system level context information.

Still another aspect of the present invention is a message oriented middleware system comprising a subscriber to a topic and a message oriented middleware system adapted to send a subset of the plurality of messages in the topic to the subscriber in accordance with a selection criteria. The selection criteria in these embodiments includes an internationalization context.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 2:
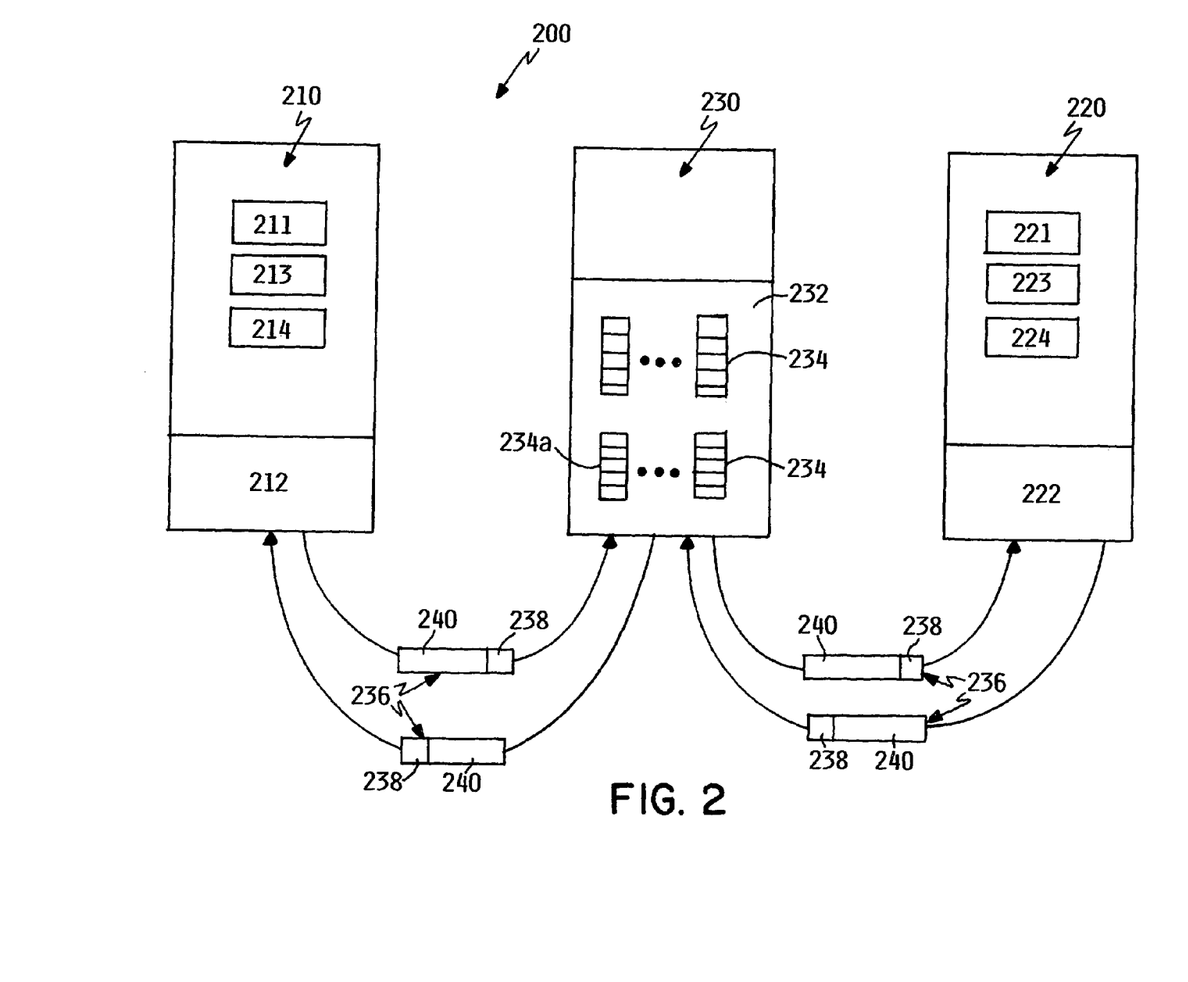
FIG. 2 is a loosely coupled enterprise computing environment in accordance with one embodiment of the present invention.

FIG. 2 illustrates a loosely coupled enterprise computing environment embodiment 200 comprising a front-end server 210, a back-end server 220, and a messaging server 230. The front-end server 210 includes a front-end application program 211, message-producing client application 212, an internationalization handler 213, and a thread context manager 214. The back-end server 220 similarly includes a back-end application 221, message-consuming client application 222, and a thread context manager 224. The message-producing client application 212 communicates with the message-consuming client application 222 through a message-oriented middleware ("MOM") application 232. The MOM application 232 includes a plurality of message "queues" 234 (or "topics" in publish/subscribe messaging), one of which 234a the message-consuming client 222 is subscribed. The message-producing client 212, the message-consuming client 222, and the MOM application 232 communicate via messages 236, each of which comprises a message body 238 and a plurality of message headers 240.

In operation, the front-end application program 211 produces a request for service from the back-end application program 221. The message-producing client 212 receives this service request from the application program 211, creates a message 236, and sends the message 236 to the MOM application 232. Next, the internationalization handler 213 intercepts the message 236, and then determines the internationalization context associated with the requesting application 211 from the thread context manager 214. The internationalization handler 213 then attaches the internationalization context to the message 236, and then allows the message 236 to continue to the MOM application 232.

The MOM application 232 receives the message 236 from the message-producing client 212 and assigns the message 236 to the message queue 234a associated with the message-consuming client 222. The messaging program 232 stores the message 236 in the queue 234a and delivers ("dispatches") the message 236 to the message-consuming client 222.

After the message-consuming client 222 requests and receives the message 236 from the MOM application program 232, the message-consuming client 222 prepares to send the service request to the application program 221. At this point, the internationalization handler 223 intercepts the service request and extracts the internationalization context from the associated message header 240. The internationalization handler 223 then stores the internationalization context in the thread context manager table 224 and then allows the service request to continue the application 221. The service request in the message body 238 is then processed according to the associated internationalization context in the context manager 224.

Figure 3:
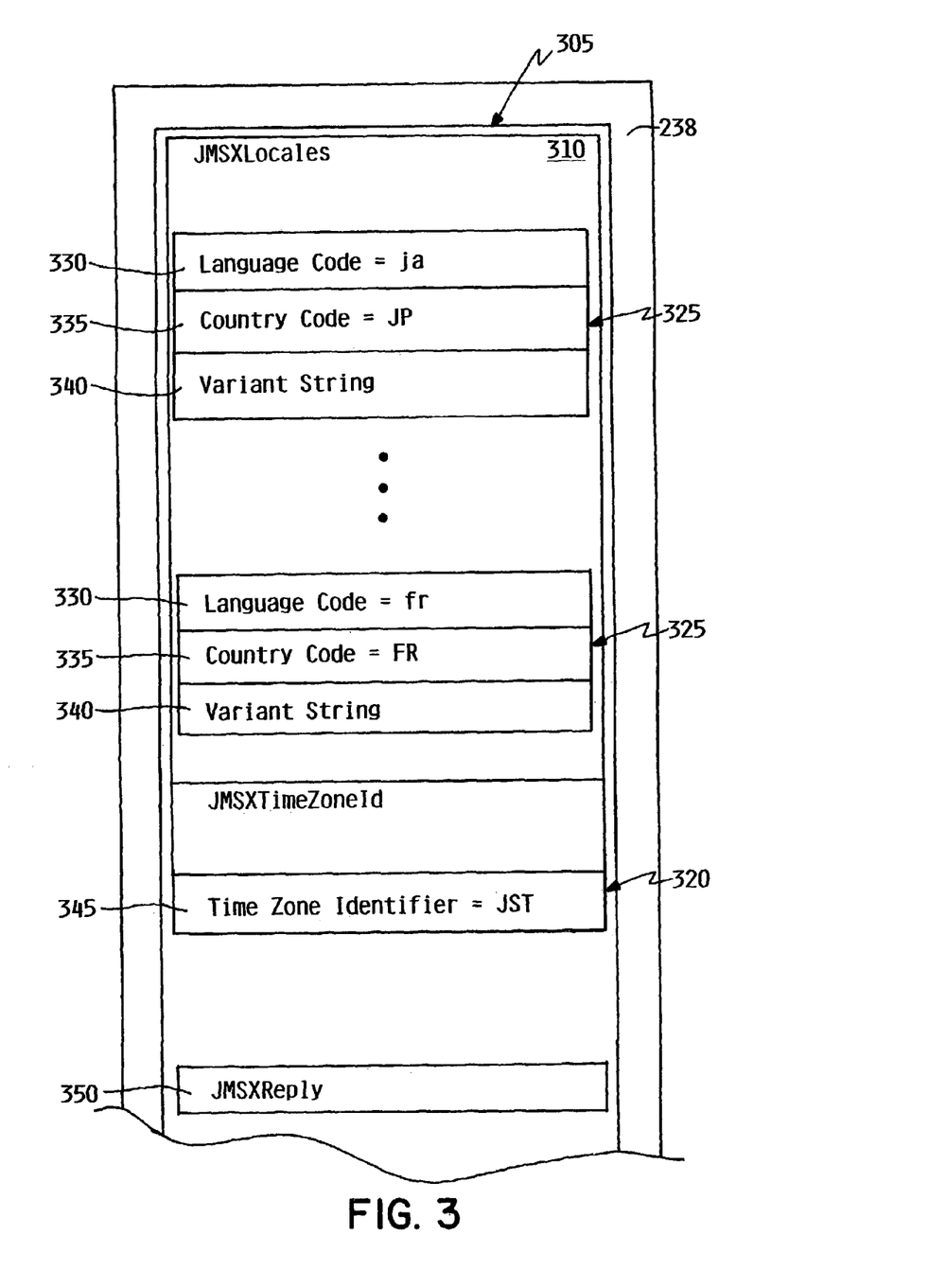
FIG. 3 illustrates a MOM message header embodiment.

FIG. 3 illustrates the internationalization context 305 in one message header 240 embodiment. The internationalization handler 213 attaches the internationalization context into the message header 240 in this embodiment using two "string typed" JMS defined properties as optional fields (e.g., "JMSXLocales" 310 and "JMSXTimeZoneId" 320). The message-producing client 212 sets the value of JMSXLocates property 310 to a space-delimited ordered list of stringified versions of java.util.Locale objects 325. Each object 325, in turn, comprises at least of a language code 330 (such as a two character ISO-639 identifier) and a country code 335, (such as a two character ISO-3166 identifier). Some embodiments may also include a variant-string 340, which contains other locale-relevant information, such as a particular language dialect or region within a country. The objects 325 in the JMSXLocales property 310 are ordered according to the message-producing application's 212 preference, with the most preferred locale generally being the message producer's locale. The message-producing client 212 similarly sets the value of the JMSXTimeZoneId property 320 to be a preferred time zone identifier 345.

For example, as illustrated in FIG. 3, the internationalization handler 213 respectively set the values of the JMSXLocales 310 and of the JMSXTimeZoneId 320 properties to ja_JP, fr_FR, and JST. The intention of the message-producing client 212 is to convey the following information to the message consumer for localizing the processing of the transmitted message 236:
    if (Japanese resources are available),
        localize the requested computation in Japanese locale
    else
        if (French resources are available)
            localize the requested computation in French locale
        else
            use the default locale of 221
    localize the requested computation in the Japanese Standard Time (JST) time zone.
One advantage of using JMS defined properties is that JMS provider 232 support for the JMSXLocales 310 and JMSXTimeZoneId 320 properties will be optional, and thus backward-compatible. Using these properties also enables messaging applications to select messages based on internationalization information, such as language. However, those skilled in the art will recognize that the capability to provide distributed internationalization will be compromised for a JMS provider 230 if it does not support these properties.

Figure 4:
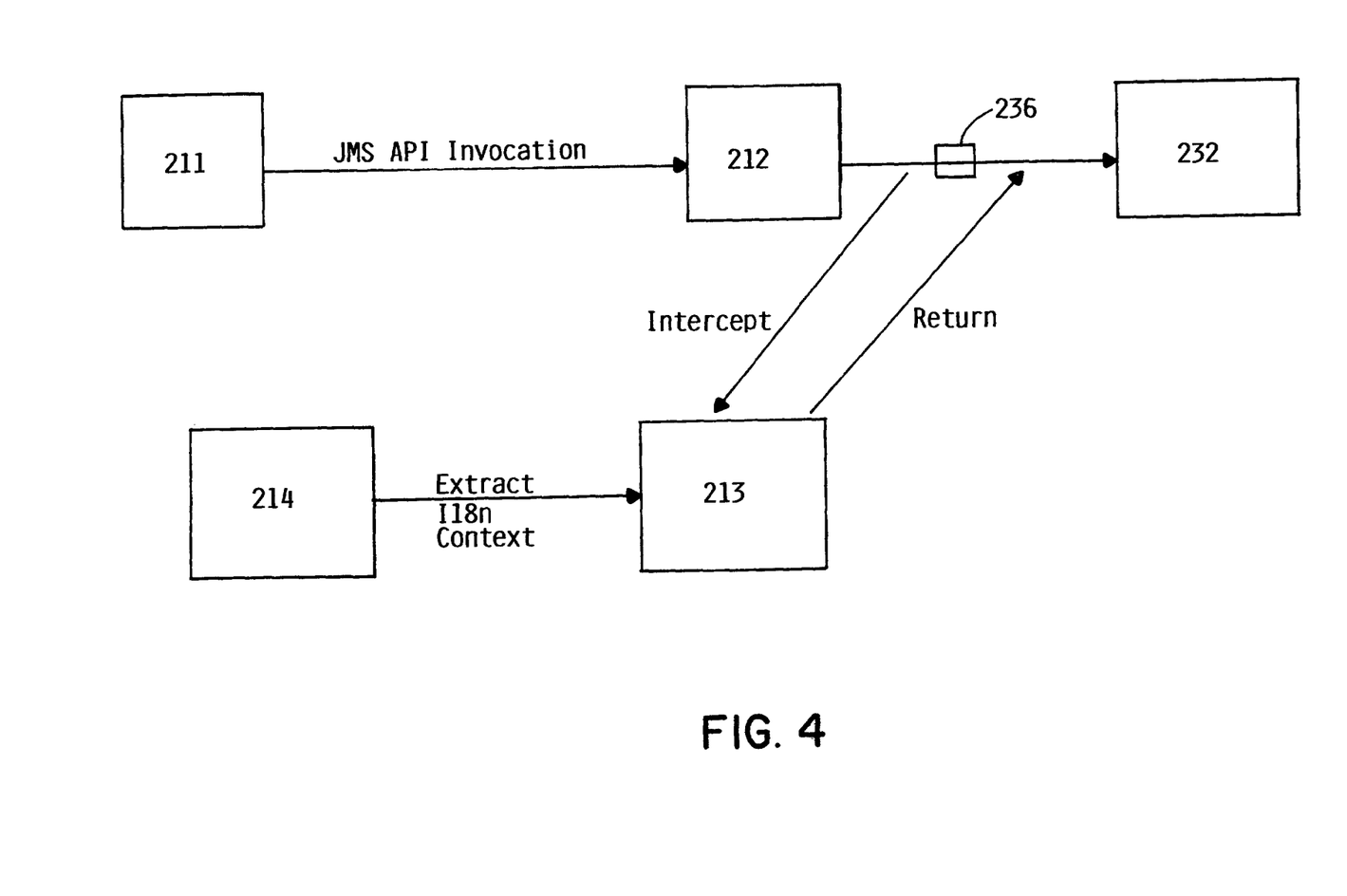
FIG. 4 illustrates the operation of one embodiment of the present invention at the message-production side.

FIG. 4 illustrates the operation of the message-producing client 212 in more detail. At the message production side, the internationalization handler 213 transparently intercepts an outbound MOM message 236 originating from a managed message-producing client 212. Next, the internationalization handler 213 obtains the internationalization context ("i18nCntxt") associated with the requesting application 211 from the thread context manager 214 using, for example, the SPI1 system programming interface described in application Ser. No. 10/041,219, which was previously incorporated by reference.

The internationalization handler 213 then converts the i18nCntxt into the ordered list of stringified locale objects 325 described with reference to FIG. 3, and uses that list to create the JMSXLocales property 310. Next, the internationalization handler 213 determines the time zone identifier from the i18nCntxt, and uses the time zone identifier to create the JMSXTimeZoneId property 320 for the intercepted JMS message before relinquishing control. Finally, the modified message 236 is delivered to the JMS provider 232. Those skilled in the art will appreciate that these embodiments are desirable because the JMS internationalization handler 213 transparently modifies the original JMS message 236 by appending the internationalization context using the JMSXLocales 310 and the JMSXTimeZoneId 320 properties.

Figure 5:
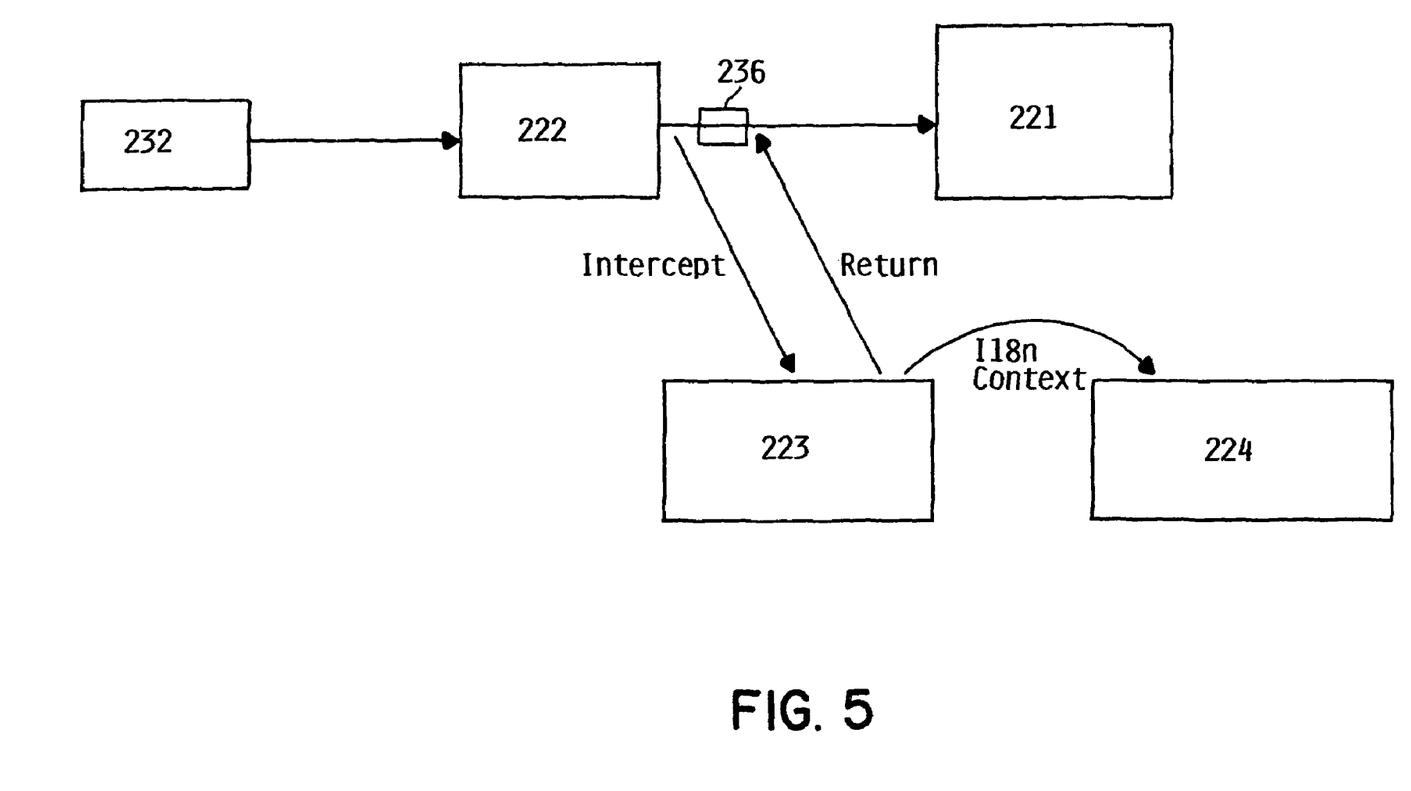
FIG. 5 illustrates the operation of one embodiment of the present invention at the message-consumption side.

FIG. 5 illustrates the operation of the message-consuming client 222 in more detail. At the MOM message consumption-side, the internationalization handler 223 transparently intercepts the inbound JMS message 236 destined for the back end application 221. The internationalization handler then extracts the value of the JMSXLocales 310 and JMSXTimeZoneId 320 properties associated with the intercepted JMS message 236. Next, the internationalization handler 223 creates list of preferred locales (in this embodiment, an ordered chain of "java.util.Locale" objects) from the value of the extracted JMSXLocales 310 (which, in this embodiment, should be a delimited ordered list of stringified locale objects having the same ordering as in JMSXLocales property 310). The internationalization handler 223 then creates a java.util- .TimeZone ("TimeZone") object from the value of the extracted JMSXTimeZoneId 320 property (which, in this embodiment, should be a JDK recognized time zone identifier). Next, the internationalization handler 223 uses the extracted information to create an internationalization context ("i18nCntx"). Finally, the internationalization handler sets the caller internationalization context for the current thread of execution to "i18nCntxt" in the ThreadContextManager 224 component of the internationalization service using an appropriate interface using, for example, the SPI2 system programming interface described in application Ser. No. 10/041,219, which was previously incorporated by reference.

In the event that an inbound JMS message 236 does not have the JMSXLocales property 310, the internationalization handler 223 in this embodiment will create a single element default locales object using the default locale of the server hosting the JMS message-consuming client 222 and/or the back end application 221. In the event that the inbound JMS message 236 does not have the JMSXTimeZoneId property 320, the internationalization handler 223 in this embodiment will create a default TimeZone object using the default time zone of the server hosting the MOM system. In still other embodiments, the handler 223 may use externally defined default values, such as Extended Markup Language ("XML") definitions within a J2EE deployment descriptor, for the JMSXLocales and JMSXTimeZoneId properties whenever an inbound message respectively lacks either. Moreover, some of these embodiments may use multiple externally defined default values (e.g., node level defaults, application level defaults, component level defaults, and method level defaults) and will typically choose the default values associated with the lowest level entity. For any default value computed above, "defaultI18nCntxt," the handler 223 sets the caller internationalization context for the current thread of execution to "defaultI18nCntxt" in the ThreadContextManager 224 component of the internationalization service.

Those skilled in the art will appreciate that the embodiment in FIG. 5 is desirable because, in storing the internationalization context, the SPI2 interface associates the extracted internationalized context as the caller internationalization context with the current thread of execution in the thread context manager 224. The thread context manager 224, in turn maintains the association between executing threads and any corresponding internationalization contexts. As such, these internationalization contexts may be supplied upon request by a JMS provider application 232, and may be propagated to another JMS provider application 232. In these embodiments, it may also be desirable for the thread context managers 224, 214 to associate two internationalization contexts with the threads of execution, namely the caller internationalization context and the invocation internationalization context. The caller internationalization context is the internationalization context associated with the inbound call, which in this embodiment is the internationalization context carried by the JMSXLocales and JMSXTimeZoneId JMS defined properties from the message-producing client. The invocation internationalization context is determined from the internationalization context management policy associated with the message-consuming client. In this way, the consuming client can operate under the context prescribed by the policy, or under that of the message producer.

In addition to the JMSXLocales and JMSXTimeZoneId properties, some embodiments of the present invention may define an additional property (i.e., an optional JMS header field called "JMSXReply") that indicates whether the message is an original request, or a reply to a message generated by another client application 211, 221. The message consuming client application 222 uses the JMSXReply property to determine whether or not to use the internationalization context in an incoming message. That is, applications have a configurable internationalization context management policy. This policy prescribes which of three internationalization contexts will comprise the invocation internationalization context associated with the thread on which the component or method executes. A policy may be externally defined, for example, as an XML definition within a J2EE application deployment descriptor, and may be configured to one of three settings: "run-as-caller," "run-as-server," and "run-as-specified." Some embodiments may use multiple externally defined policies (e.g., application level policies, component level policies, and a method level policies) and will typically choose the polices associated with the lowest level entity, with an ultimate policy defaults to "run-as-caller" whenever it is not properly defined externally. These embodiments are desirable because, when the threads involved in a transaction use different policies, one of the threads can affect the context of the other in an unpredictable manner. For example, assuming the front-end application program 211 is using the "run-as-caller" policy, a service request to the back-end application program 221 will initially operate under the invocation internationalization context of the front-end application program 221. If the back-end application program 221 is using the "run-as-server" policy, the reply to the service request will contain the back end program's 221 internationalization context. Because the front-end application program 221 is using the "run-as-caller" policy, the front end application's caller and invocation internationalization contexts will switch to the back end's context when it receives the reply message. Those skilled in the art will appreciate that this is a particular problem in loosely coupled environments because the application programs 211, 221 are frequently legacy programs whose internationalization context(s) remains invariant upon receiving a reply from a service request.

In embodiments using the JMSXReply property, however, the message-consuming client application 212 (acting as a synchronous receiver in this example) will be able to recognize that the reply message is, in fact, a reply and ignore the new internationalization context. In some embodiments, the front end application 211 and the back-end application 221 will set the JMSXReply programmatically. That is, the front-end application 211 and the back-end application 221 will tell the message clients 212, 222 whether or not the message is a reply to an earlier request. In other embodiments, the front-end application 211 and the back-end application may be designed to work with a managed container system in which reply messages are created using a special method, which makes setting of the property transparent to the application. In these embodiments, the message clients 212, 222 can use the special call to set the JMSXReply property. One suitable managed container system is Extended Messaging of IBM WebSphere, available from International Business Machines, Inc. of Armonk, N.Y. In still other embodiments, the MOM application 232 may use an externally defined value, such as an XML definition within a J2EE deployment descriptor, for the JMSXReply property; usually set to indicate that the message is 'not a reply.' Some of these embodiments may use multiple values (e.g., application level, component level, and method level) and will typically use the value associated with the lowest level entity; and whenever the value is not properly externally defined, will indicate the message is 'not a reply' by default.

Referring again to FIG. 2, the MOM application 232 in this embodiment may be any system capable of coordinating loosely coupled communications between two or more message clients 212, 222, and may organize these communications through any suitable messaging protocol, such as publish/subscribe or point-to-point. Those skilled in the art will appreciate that, although depicted as separate applications on separate computers, the message-producing client 212, the message-consuming client 222, and the MOM application 232 are logical constructs, and in fact, a single computer system (or even a single thread of execution) may exhibit characteristics of all three elements. Similarly, the message-producing clients 212, 222 may actually be integrated into the application programs 211, 221. One suitable message-producing client 212, message-consuming client 222, and MOM application 232 is the Websphere MQ family of programs available from International Business Machines, Inc., of Armonk, N.Y.

Figure 6:
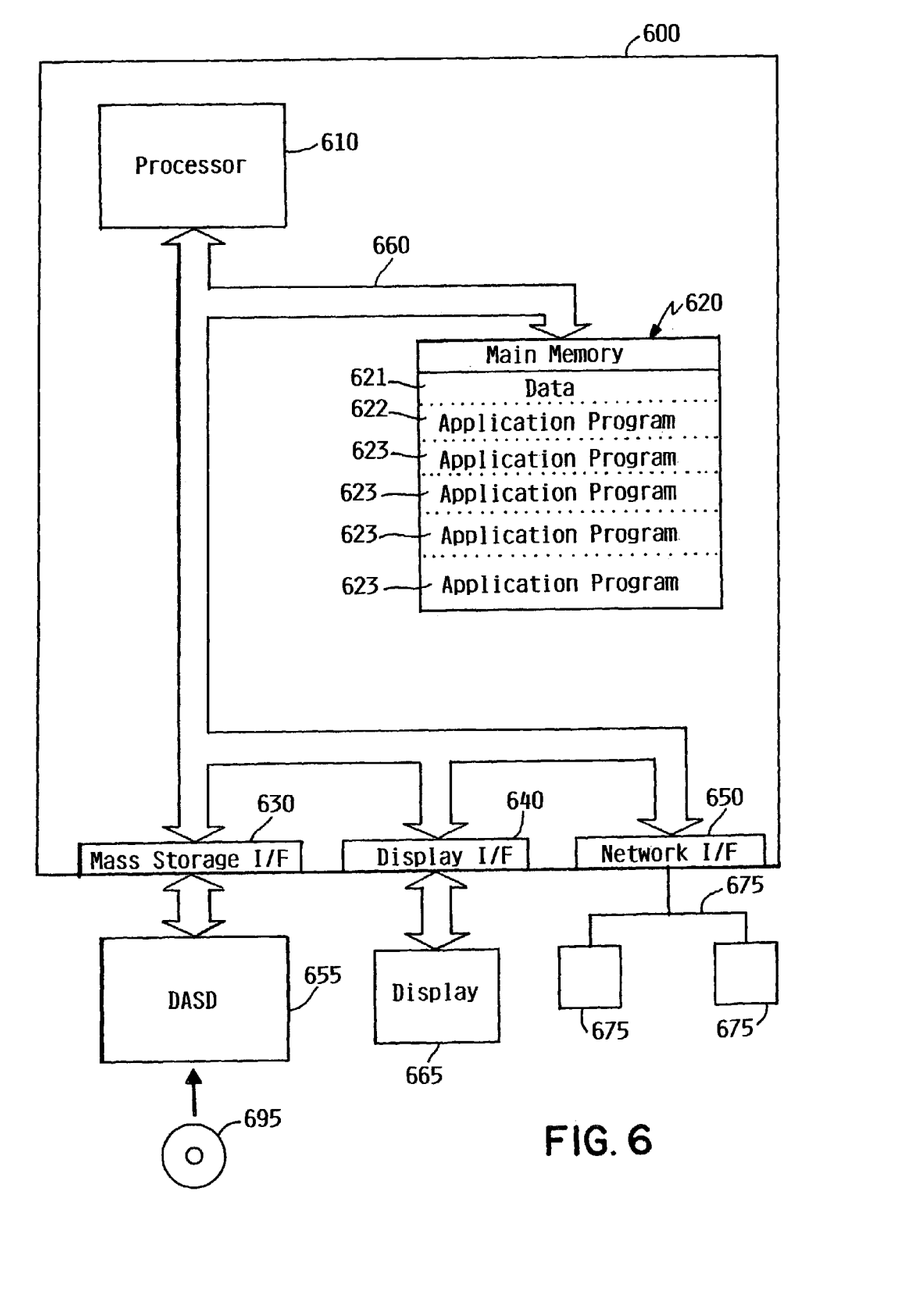
FIG. 6 is a computer embodiment suitable for use with the present invention.

FIG. 6 shows a computer 600 embodiment suitable for use as the front-end server, the back-end server, or the messaging server. The computer system 600 embodiment in FIG. 6 comprises a processor 610, a main memory 620, a mass storage interface 630, a display interface 640, and a network interface 650. These system components are interconnected through the use of a system bus 660. Mass storage interface 630 is used to connect mass storage devices (such as a direct access storage device 655) to computer system 600. One specific type of direct access storage device 655 is a readable and writable compact disk ("CD") drive, which may store data to and read data from a CD-RW disk 695.

Main memory 620 in accordance with the preferred embodiments contains data 621, an operating system 622, and one or more application programs 623. The data 121 represents any data that serves as input to or output from any program in computer system 100. The software applications 623 comprise a detailed set of instructions, such as the message-producing client or the message-consuming client, that describe how the computer 600 is to access, manipulate, and store the data 621.

The computer system 600 utilizes well known virtual addressing mechanisms that allow the programs of computer system 600 to behave as if they only have access to a large, single storage entity instead of access to multiple, smaller storage entities such as main memory 1620 and DASD device 655. Therefore, while the data 621, the operating system 622, and the application software 623 are shown to reside in main memory 120, those skilled in the art will recognize that these items are not necessarily all completely contained in main memory 120 at the same time, and may also reside in the virtual memory of other computer systems coupled to the computer system 600.

The processor 610 may be constructed from one or more microprocessors and/or integrated circuits. Processor 610 executes program instructions stored in main memory 620. Main memory 620 stores programs and data that processor 110 may access. When computer system 600 starts up, processor 610 initially executes the program instructions that make up operating system 622, which manages the resources of the computer system 600. These resources include the processor 610, the main memory 620, the mass storage interface 630, the display interface 640, the network interface 650, and system bus 660.

Although computer system 600 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 610. However, those skilled in the art will appreciate that the present invention applies equally to computer systems that simply use I/O adapters to perform similar functions.

The display interface 640 is used to directly connect one or more displays 665 to computer system 600. These displays 665, which may be non-intelligent (i.e., dumb) terminals or fully programmable workstations, are used to allow system administrators and users to communicate with computer system 600. Note, however, that while the display interface 640 is provided to support communication with one or more displays 665, the computer system 100 does not necessarily require a display 665, because all needed interaction with users and other processes may occur via network interface 650.

The network interface 150 is used to connect other computer systems and/or workstations 675 (e.g., to interconnect the front-end server 210, the back-end server 220, and the messaging server 230 in FIG. 1) to computer system 600 across a network 670. The present invention applies equally no matter how computer system 600 may be connected to other computer systems and/or workstations, regardless of whether the network connection 670 is made using present-day analog and/or digital techniques or via some networking mechanism of the future. In addition, many different network protocols can be used to implement a network. These protocols are specialized computer programs that allow computers to communicate across network 670. TCP/IP (Transmission Control Protocol/Internet Protocol) is an example of a suitable network protocol.

One suitable computer 600 is an eServer iSeries® computer running the OS/400® multitasking operating system, both of which are produced by International Business Machines Corporation of Armonk, N.Y. However, those skilled in the art will appreciate that the mechanisms and apparatus of the present invention apply equally to any computer system and operating system, regardless of whether the computer system is a complicated multi-user computing apparatus, a single workstation, or an embedded control system.

Although the present invention has been described in detail with reference to certain examples thereof, it may be also embodied in other specific forms without departing from the essential spirit or attributes thereof. For example, those skilled in the art will appreciate that the present invention is capable of being distributed as a program product in a variety of forms, and applies equally regardless of the particular type of signal bearing media used to actually carry out the distribution. Examples of suitable signal bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive, a CD-R disk, a CD-RW disk, or hard-disk drive); or (iii) information conveyed to a computer by a communications medium, such as through a computer or telephone network, including wireless communications, and specifically includes information downloaded from the Internet and other networks. Such signal-bearing media, when carrying computer-readable instructions that direct the functions of the present invention, represent embodiments of the present invention.

The present invention and its context management system are also desirable to propagate information other than internationalization context. For example, some embodiments may use the present invention may transmit a security context with the message. These embodiments may be particularly desirable if they use the JMSXReply property described earlier to prevent an unwanted security protocol change.

The present invention offers numerous advantages over conventional internationalization methods. For example, the message handler 223 on the consumption side always sets only the caller internationalization context to that contained in the delivered message, provided the JMSXReply property indicates 'not a reply;' however, the invocation internationalization context will be set by the internationalization service as determined by the internationalization context management policy associated with the managed JMS listener or receiver component. That is, the internationalization context is prescribed at development time, not at run time. Another advantage is that the existence of internationalization handlers 213, 223 makes the propagation of internationalization context through JMS messages completely transparent, and in doing so, makes application development less error prone by alleviating the programmer from conventional, non-standard solutions for handling locale and time zone mismatches. A MOM programmer is not required to be aware of the existence nor the use of the MOM defined properties for propagating internationalization context; however, the service will indeed manage internationalization context(s) over MOM applications on behalf of applications. Further, the programmer no longer must revise application interfaces to manage internationalization context—a condition that significantly increases application uptime because the system administrator does not have to redeploy the application. For application developers that choose to utilize the MOM defined internationalization properties, consider their role in a publish/subscribe MOM application.

Figure 7:
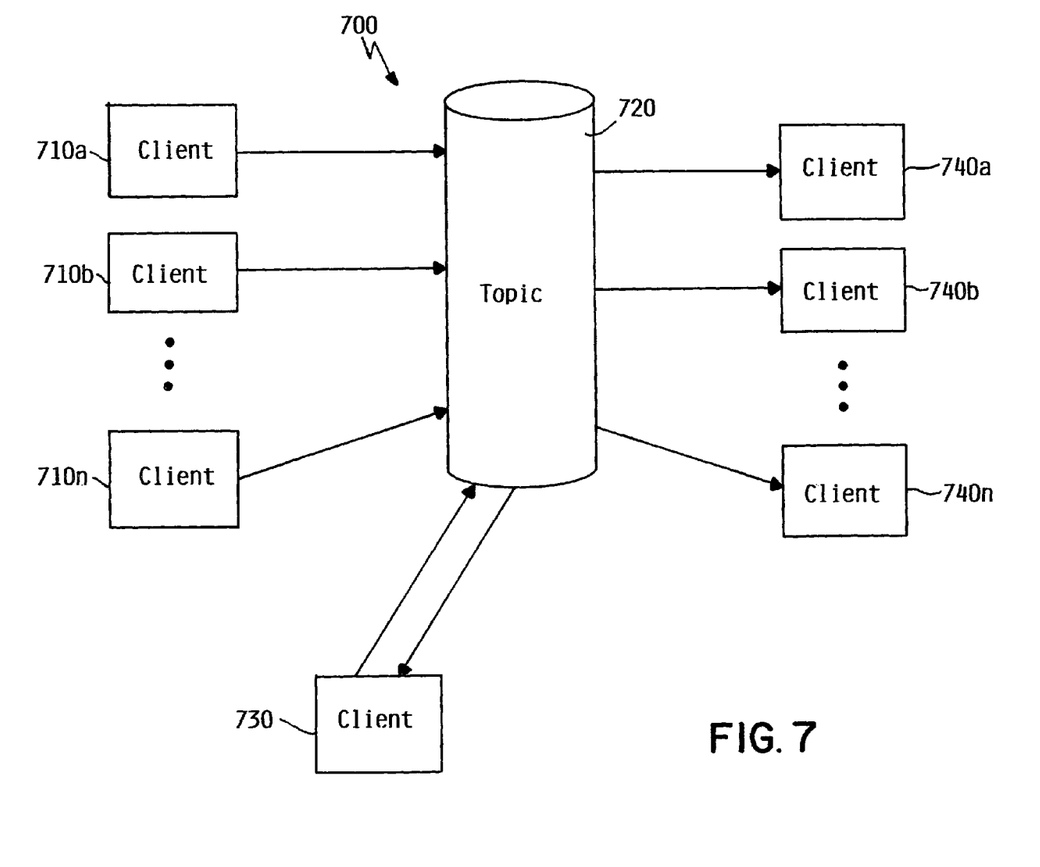
FIG. 7 depicts a MOM application configured for publish/subscribe messaging.

Still another advantage of the present invention is that it provides a facility for message consumers to select messages according to a message's internationalization-pertinent properties. For example, FIG. 7 presents an embodiment of a simple publish/subscribe MOM application 700 comprising one or more MOM clients ("publishers") 710 that publish (send) messages to a particular destination referred to as a "topic" 720; one or more MOM clients ("subscribers") 740 that receive messages from the topic 720; and one or more MOM clients 730 that both publish and subscribe to the topic 720. In this embodiment, the subscribers 740 can register with the MOM system to receive messages meeting any criteria involving locale and time zone information. Thus, a subscriber 740 may direct the MOM system's selection facility to receive messages published in Brazil, messages published in the Brazilian Portuguese language, or messages published in the GMT time zone. Moreover, selecting messages in this manner can be achieved in applications that utilize different MOM systems, assuming these systems embody the present invention. These embodiments are desirable because they enable the subscribers 740 depicted in FIG. 7 to realize the capability to systematically select messages from a topic 720 according to internationalization-pertinent criteria in applications spanning multiple MOM systems.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Furthermore, although features and advantages of the present invention have been described with reference to point-to-point messaging systems or publish/subscribe messaging systems, those skilled in the art will appreciate that these features and advantages apply equally to both types of systems. Therefore, it is desired that the embodiments described herein be considered in all respects as illustrative, not restrictive, and that reference be made to the appended claims for determining the scope of the invention.

We claim:

1. A computer-implemented method for providing internationalization context in a messaging middleware environment, comprising:
   generating a message-oriented middleware ("MOM") message at a message-producing client application in response to a service request from a requesting application;
   transmitting the message from the message-producing client application to a service provider;
   transparently intercepting, at a first internationalization handler, the message before the message arrives at the service provider;
   automatically determining, at the first internationalization handler, an internationalization context associated with the requesting application;
   automatically attaching, at the first internationalization handler, a header including the internationalization context to the intercepted message using Java Message Service (JMS) defined properties,
   wherein the internationalization context comprises a JMS defined locale field and a JMS defined time zone field,
      wherein the locale field includes information defining at least one of a language and a country, and
      wherein the time zone field defines the time zone of the message-producing client application; and
   automatically sending the intercepted message with the attached internationalization context to a messaging facility for delivery to the service provider,
   wherein the messaging facility comprises a MOM facility.

2. The method of claim 1, further comprising:
   automatically determining, at a thread context manager, the internationalization context associated with a thread on which the request is executing.

3. The method of claim 2, wherein the thread context manager determines the internationalization context using a table that associates the internationalization context with the thread.

4. The method of claim 1, wherein the internationalization context is an invocation internationalization context.

5. The method of claim 1, further comprising:
   receiving the message from the messaging facility; and
   automatically extracting, at a second internationalization handler, the internationalization context from the message;
   automatically storing the extracted internationalization context in a thread context manager table;
   automatically forwarding the message to the service provider; and
   processing the message by the service provider in accordance with the extracted internationalization context.

6. The method of claim 5, further comprising associating the internationalization context with a thread of execution.

7. The method of claim 1, wherein the Java Message Service (JMS) defined properties comprise locale information and time zone information.

8. The method of claim 7, wherein the locale information comprises one or more string-typed properties chosen from the group consisting of a language identifier, a country identifier, and a variant string.

9. A computer-implemented method for providing internationalization context in a messaging middleware environment, comprising:
   providing a message-oriented middleware ("MOM") message,
      wherein the message was generated at a message-producing client application in response to a service request from a requesting application and transmitted to a service provider, and
      wherein the message comprises an internationalization context and a service request for the service provider,
         wherein the internationalization context comprises a JMS defined locale field and a JMS defined time zone field,
            wherein the locale field includes information defining at least one of a language and a country, and
            wherein the time zone field defines the time zone of the message-producing client application;
   transparently intercepting, at an internationalization handler associated with the service provider, the message wherein the interception occurs during transit between the message-producing client application and the service provider;
   at the internationalization handler, automatically extracting the internationalization context from the message;
   at the internationalization handler, automatically storing the extracted internationalization context to a thread context manager table that associates the internationalization context with a thread upon which the service request is dispatched,
      wherein the thread context manager table is referred to provide the internationalization context of the requesting application to messages sent in response to the service request from the service provider to the message-producing client application;
   forwarding the intercepted message from the internationalization handler to the service provider; and
   at the service provider, automatically processing the service request according to the internationalization context.

10. The method of claim 9, wherein processing the service request according to the internationalization context comprises generating a reply to the service request.

11. The method of claim 9, further comprising:
   generating a reply message containing the reply to the service request;
   attaching an internationalization context associated with the service provider to the reply message; and
   sending the reply message with the internationalization context associated with the service provider to a messaging facility, wherein the messaging facility comprises a MOM facility.

12. The method of claim 9, further comprising selecting a default value if the internationalization context does not contain an internationalization attribute, wherein the default value is selected from the group consisting of node level defaults, application level defaults, component level defaults, and method level defaults.

13. The method of claim 12, wherein selecting a default value comprises selecting the default value associated with a lowest level entity for which a default value is available.

14. A computer program product, comprising:
   a non-transitory computer readable storage medium storing a program which, when executed by a processor, performs a method of sending a message from a message-producing client to a message-consuming client in a message-oriented middleware environment, the method comprising:
      generating a message-oriented middleware ("MOM") message at a message-producing client application in response to a service request from a requesting application;
      transmitting the message from the message-generating client application to a service provider;
      transparently intercepting, at a first internationalization handler, the message before the message arrives at the service provider;
      automatically determining, at the first internationalization handler, an internationalization context associated with the requesting application;
      automatically attaching, at the first internationalization handler, a header including the internationalization context to the intercepted message using Java Message Service (JMS) defined properties,
         wherein the internationalization context comprises a JMS defined locale field and a JMS defined time zone field,
            wherein the locale field includes information defining at least one of a language and a country, and
            wherein the time zone field defines the time zone of the message-producing client application; and
      automatically sending the intercepted message with the attached internationalization context to a messaging facility for delivery to the service provider,
         wherein the messaging facility comprises a MOM facility.

15. The computer program product of claim 14, wherein the non-transitory computer readable storage media comprises a non-rewritable storage media.

16. A method for managing message context in a messaging middleware environment, comprising:
   generating, at a service provider, a message-oriented middleware ("MOM") message;
   transmitting the message to a client application;
   transparently intercepting the message by an international handler associated with the service provider;
   attaching to the message, by the internationalization handler, an internationalization context and a reply indicator,
      wherein the internationalization context comprises:
         a JMSXLocales property from an optional Java Messaging Service (JMS) defined locale field providing a locale of the service provider;
         a JMSXTimeZoneID property from an optional Java Messaging Service (JMS) defined time zone field providing a time zone of the service provider;

receiving, at the client application, the message;
determining, by the client application, whether to use the internationalization context included in the message, wherein the determination is based at least in part on the reply indicator indicating that the message is a reply to a previous message sent from the client application, based on a determination that the internationalization context is not to be used, ignoring the internationalization context included in the message.

17. The method of claim 16, wherein the message context comprises a security context.

18. The method of claim 16, further comprising using a default value to generate the reply indicator.

19. The method of claim 18, wherein the default value is specified within an XML definition of a J2EE deployment descriptor.

20. The method of claim 16, further comprising using a managed messaging environment call to generate the reply indicator.

* * * * *